(12) United States Patent
Kushmerick (10) Patent No.: US 8,290,906 B1
(45) Date of Patent: Oct. 16, 2012

(54) INTELLIGENT RESOURCE SYNCHRONIZATION

(75) Inventor: Nicholas Kushmerick, Seattle, WA (US)

(73) Assignee: Decho Corporation, Pleasant Grove, UT (US)

( * ) Notice: Subject to any disclaimer, the term of this patent is extended or adjusted under 35 U.S.C. 154(b) by 282 days.

(21) Appl. No.: 12/586,766

(22) Filed: Sep. 28, 2009

(51) Int. Cl.
*G06N 7/06* (2006.01)
*G06F 17/30* (2006.01)

(52) U.S. Cl. .................... 707/634; 707/640; 703/21

(58) Field of Classification Search .................. 707/610, 707/624, 626, 634, 640
See application file for complete search history.

(56) References Cited

U.S. PATENT DOCUMENTS

| | | | |
|---|---|---|---|
| 6,714,951 B2* | 3/2004 | Bills et al. .................... | 707/610 |
| 7,412,492 B1 | 8/2008 | Waldspurger | |
| 7,433,951 B1 | 10/2008 | Waldspurger | |
| 7,577,722 B1 | 8/2009 | Khandekar et al. | |
| 2006/0106852 A1* | 5/2006 | Siddall et al. ................ | 707/101 |
| 2007/0033275 A1* | 2/2007 | Toivonen et al. ............. | 709/224 |
| 2007/0055706 A1* | 3/2007 | Morris ......................... | 707/200 |
| 2008/0126547 A1 | 5/2008 | Waldspurger | |
| 2009/0112789 A1 | 4/2009 | Oliveira et al. | |
| 2009/0112811 A1 | 4/2009 | Oliveira et al. | |
| 2009/0112879 A1 | 4/2009 | Oliveira et al. | |
| 2009/0112880 A1 | 4/2009 | Oliveira et al. | |
| 2009/0112921 A1 | 4/2009 | Oliveira et al. | |

OTHER PUBLICATIONS

Denehy, Bridging the Information Gap in Storage Protocol Stacks, 2002, pp. 1-28.*
"Amazon Simple Storage Service: Developer Guide," API Vers. 2006-03-01, Amazon web services, 2008, 153 pp.
Zheng, W. et al., "Cloud Service and Service Selection Algorithm Research," *GEC '09*, Jun. 12-14, 2009, Shanghai, China, pp. 1045-1048.

* cited by examiner

*Primary Examiner* — Rehana Perveen
*Assistant Examiner* — Albert Phillips, III
(74) *Attorney, Agent, or Firm* — Muirhead and Saturnelli, LLC (57) ABSTRACT

Synchronizing resources shared among a plurality of devices includes determining access information about each of the resources, determining activity for each of the resources on at least a subset of the devices based on the access information, estimating future use of the devices, providing an estimate of a desire to have particular resources on particular devices according to the activity and future use, and synchronizing resources according to the estimate of a desire to have particular resources on particular devices. The resources may be data files. Access information may include information about when the resources were read and/or may include information about when the resources were renamed, created, and modified. Estimating a desire to have particular resources on particular devices may take into account a user's desire to maintain backup files and/or maintain certain types of files on certain devices.

18 Claims, 8 Drawing Sheets

INTELLIGENT RESOURCE SYNCHRONIZATION

BACKGROUND OF THE INVENTION

1. Technical Field

This application relates to the field of storing data, and more particularly to the field of synchronizing data storage between devices.

2. Description of Related Art

A user may want to be able to access his or her personal digital information (files, music, photos, email, calendars, etc.) on any one of a number of numerous devices owned by the user (e.g., a home computer, a work computer, a laptop, a netbook, a PDA, a cell phone, etc). This may be facilitated by permanently or periodically coupling an accessible central storage device (i.e., a cloud), which may be used to transfer data between the user's devices. Accessible central storage devices include EMC's Atmos™ on-line storage product, EMC's Decho on-line personal information management product, and Amazon's S3 product, all of which are accessible via the Internet. Data files that are changed/created on one of the devices may be uploaded to the cloud and then subsequently downloaded to the remaining devices. In other instances, data files may be transferred between devices without first going through the cloud.

However, in some cases, communication with the cloud and/or each other is relatively slow for at least some of the devices and/or there is a relatively large amount of data. For example, in some cases a complete on-line backup of a user's data could take weeks. Also, communication bandwidth issues aside, some of the devices may have a relatively low memory capacity (e.g., a cell phone), and thus may not be able to accept all of the user's data. Accordingly it may not be feasible to simply copy all data to all devices.

One way to address this is to not copy any data to any device unless and until the user explicitly/manually requests a specific file on a specific device. However, this solution requires the user to remember to specify exactly which files should be copied, and to manually discard files as each device gets full. The user must also keep track of which files have been modified on which devices. For relatively large numbers of files and devices, this may not be practical.

Another solution is to provide a rule-based system that allows users to define rules for which data subsets are to be copied to which devices. However, this forces the user to create rules at the start of the process and maintain the rules over time. If a user creates new data files but does not provide corresponding rules for copying the new files, the user may not get the files transferred on to the desired device.

Thus, it would be desirable to provide be able to automatically estimate the relative importance of portions of the user's personal information and pro-actively copy the most-important elements and/or discard unimportant elements using a data file synchronization technique that addresses shortcomings of known data synchronization techniques.

SUMMARY OF THE INVENTION

According to the system described herein, synchronizing resources shared among a plurality of devices includes determining access information about each of the resources, determining activity for each of the resources on at least a subset of the devices based on the access information, estimating future use of the devices, providing an estimate of a desire to have particular resources on particular devices according to the activity and future use, and synchronizing resources according to the estimate of a desire to have particular resources on particular devices. The resources may be data files. Access information may include information about when the resources were read. Access information may include information about when the resources were renamed, created, and modified. Estimating a desire to have particular resources on particular devices may take into account a user's desire to maintain backup files, a user's desire to maintain certain types of files on certain devices, and a user's indication that certain files and types of files be replicated immediately. Activity may be estimated according to the following formula:

$$A(R) = \sum_{a \in Act(R)} F(a) + W(a) \cdot 2^{-\frac{T(sync)-T(a)}{H(a)}}$$

where Act(R) is a set of actions taken on resource R over devices in which R is stored, F(a) is an activity weight associated with action a, W(a) is a weight associated with action a, T(a) is a time that action a occurred, T(sync) is a time at which the data synchronization will occur, and H(a) is a half-life associated with action a. F(a), H(a), and W(a) may be set/determined empirically and adjusted to favor/disfavor certain activities. The resources may be subdivided into categories where each of the resources is stored on a device according to the category of the resource.

According further to the system described herein, computer software, provided in a computer-readable storage medium, synchronizes resources shared among a plurality of devices. The software includes executable code that determines access information about each of the resources, executable code that determines activity for each of the resources on at least a subset of the devices based on the access information, executable code that estimates future use of the devices, executable code that provides an estimate of a desire to have particular resources on particular devices according to the activity and future use, and executable code that synchronizes resources according to the estimate of a desire to have particular resources on particular devices. The resources may be data files. Access information may include information about when the resources were read. Access information may include information about when the resources were renamed, created, and modified. Executable code that estimates a desire to have particular resources on particular devices may take into account a user's desire to maintain backup files, a user's desire to maintain certain types of files on certain devices, and a user's indication that certain files and types of files be replicated immediately. Activity may be estimated according to the following formula:

$$A(R) = \sum_{a \in Act(R)} F(a) + W(a) \cdot 2^{-\frac{T(sync)-T(a)}{H(a)}}$$

where Act(R) is a set of actions taken on resource R over devices in which R is stored, F(a) is an activity weight associated with action a, W(a) is a weight associated with action a, T(a) is a time that action a occurred, T(sync) is a time at which the data synchronization will occur, and H(a) is a half-life associated with action a. F(a), H(a), and W(a) may be set/determined empirically and adjusted to favor/disfavor certain activities.

According further to the system described herein, a device includes a plurality of resources and executable code, provided in a computer-readable storage medium, that synchronizes resources shared by the device with other devices, the software including executable code that receives access information about resources, executable code that determines activity for each of the resources based on the access information, executable code that provides an estimate of a desire to have particular resources on the device according to the activity and an estimate of future use of the device, and executable code that requests resources from the other devices according to the estimate. The resources may be data files. Access information may include information about when the resources were read. Access information may include information about when the resources were renamed, created, and modified. Executable code that estimates a desire to have particular resources on the device may take into account a user's desire to maintain backup files, a user's desire to maintain certain types of files on certain devices, and a user's indication that certain files and types of files be replicated immediately.

DETAILED DESCRIPTION OF VARIOUS EMBODIMENTS

Figure 1:
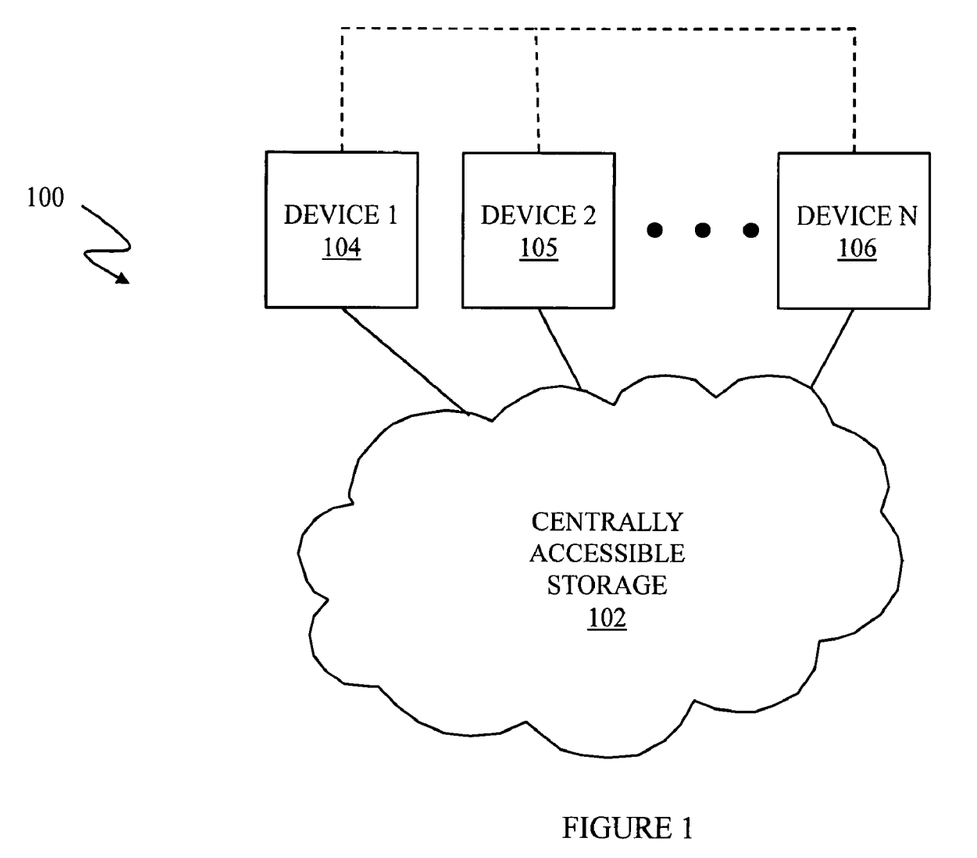
FIG. 1 is a diagram illustrating a centrally accessible storage and a plurality of devices according to an embodiment of the system described herein.

Referring to FIG. 1, a diagram 100 shows a centrally accessible storage 102 coupled to a plurality of devices 104-106. Although only three devices are shown in FIG. 1, it should be understood that the devices 104-106 represent any number of devices. The centrally accessible storage 102 may be any server or set of servicers capable of providing remote storage services to one or more clients through a communication mechanism. In an embodiment herein, the centrally accessible storage is a cloud storage system that is remotely accessed via the Internet. Examples of appropriate cloud storage systems include the Amazon S3 system and the EMC Atmos system, both of which may be accessed via the Internet. Of course, the system described herein may be implemented using other type of centrally accessible storage systems, including servers interconnected and possibly accessible using a SAN, NAS storage devices made available through a WAN, etc.

The devices 104-106 may be any type of computing devices that store data including, without limitation, desktop workstations, laptops, cell phones, PDAs, etc. Each of the devices 104-106 creates, accesses, and modifies resources (e.g., data files) that are shared and synchronized between the devices 104-106. In an embodiment herein, the resources may be synchronized through the centrally accessible storage 102 so that resources that are created and/or modified by one of the devices 104-106 is uploaded to the centrally accessible storage 102 and then subsequently downloaded to the other ones of the devices 104-106. However, as shown in FIG. 1, the devices 104-106 may also be interconnected so that the resources may be transferred directly from one of the devices 104-106 to another one of the devices 104-106. In such a case, resources may be synchronized between the devices 104-106 without having to pass through the centrally accessible storage in a peer-to-peer system. Accordingly, the system described herein includes embodiments where synchronization is through the centrally accessible storage 102, synchronization is between the devices 104-106, and both. Note also that, in some instances herein, the term "resource" may be understood to include data files as well as other types of resources that may be shared/synchronized between the devices 104-106 without necessarily being data files, such as executable code objects, email, Web history/bookmarks, calendar items, music playlists, etc.

The system described herein provides a mechanism for synchronizing resources (files) in a way that make efficient use of communication bandwidth and takes into account an estimation of the importance of having a particular resource on a particular device as well as accounting for data size and the amount of time a user has budgeted for synchronizing data. As described in more detail elsewhere herein, the ordering of resource synchronization is determined at each device to provide appropriate access to resources at each of the devices 104-106. The devices 104-106 may use any appropriate communication mechanism to transfer data.

Figure 2:
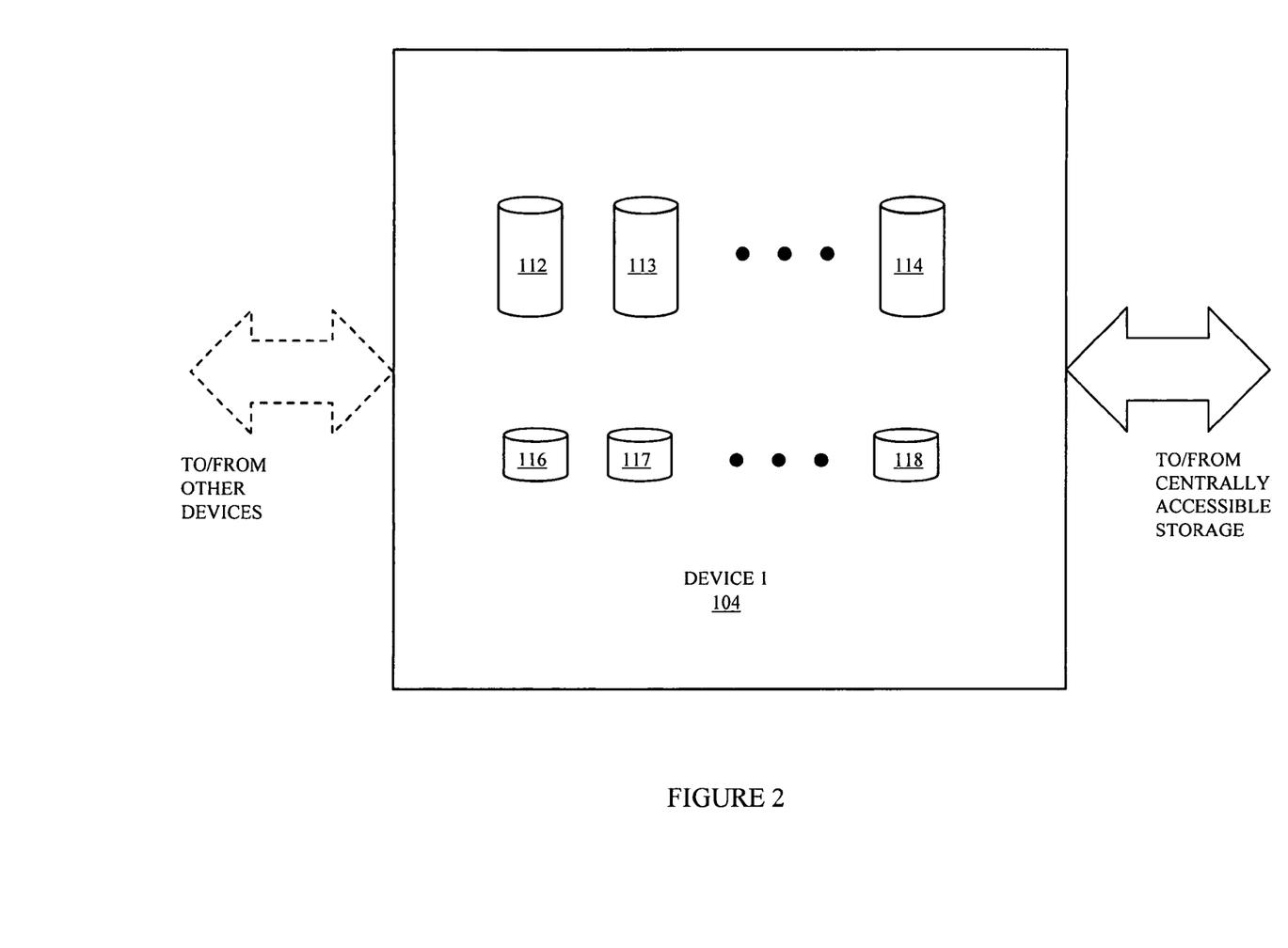
FIG. 2 is a diagram illustrating a device in detail according to an embodiment of the system described herein.

Referring to FIG. 2, the device 104 is shown in more detail as including a plurality of data files 112-114 and a plurality of data file stubs 116-118. The data files 112-114 are resources of the device 104, although the system provided herein may be implemented with other types of resources instead of or in addition to the data files 112-114. The stubs 116-118 represent portions of data files that do not include any or some of the underlying data. The portions may include the data file name, file information such as size and data of creation, etc. In an embodiment herein, the stubs 116-118 may be used as a place holder for data files that have not yet been transferred and/or to provide the illusion that all data files are present on the device 104 when, in fact, they are not. Note, however, that it is possible to implement the system described herein without the stubs 116-118 so that, in some embodiments, the devices 104-106 do not include any stubs.

The system described herein causes data files that are created/modified on other devices 105,106 to be transferred to the device 104. Similarly, data files that are created/modified at the device are transferred to the other devices. As discussed elsewhere herein, the transfers may be either through the centrally accessible storage 102 and or directly between the devices 104-106.

Figure 3:
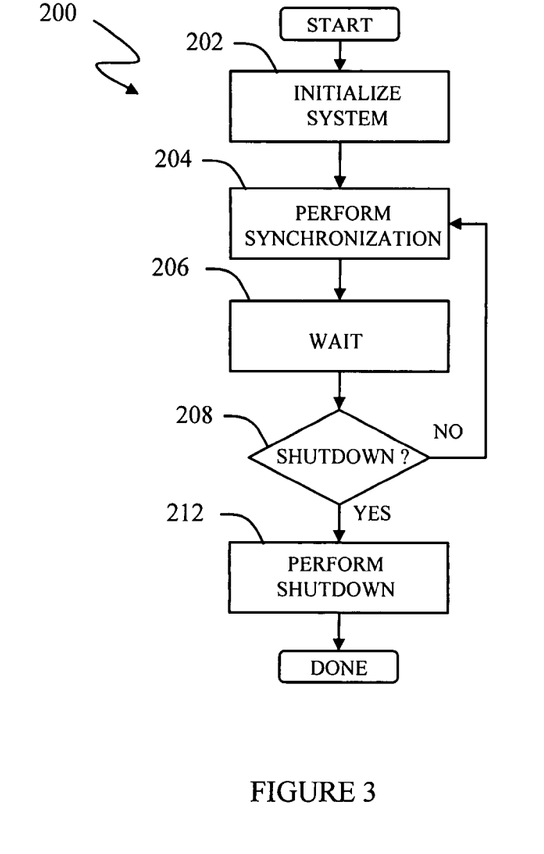
FIG. 3 is a flow chart illustrating synchronizing resources between devices according to an embodiment of the system described herein.

Referring to FIG. 3, a flow chart 200 illustrates processing performed by each of the devices 104-106 in connection with synchronizing resources between devices according to the system described herein. Processing begins at a first step 202 where the system is initialized. Initializing the system at the step 202 is described in more detail elsewhere herein. Following the step 202 is a step 204 where synchronization is performed. Performing synchronization at the step 204 is described in more detail elsewhere herein. Following the step 204 is a step 206 where the system waits for a predetermined amount of time. In an embodiment herein, synchronization is performed periodically (e.g., once per minute). Thus, the wait time at the step 206 corresponds to the period at which the synchronization is to be performed.

In some embodiments, it may be possible to dynamically adjust the period based on conditions so that, for example, when the system senses that relatively few changes are being performed, the period is increased and when the system senses that more changes are being performed. Alternatively, the system described herein may be implemented using an event driven mechanism where synchronization is performed in response to detection of a change in a resource (file) so that, if nothing changes, the step 204 is not performed.

Following the step 206 is a test step 208 where it is determined if the device is being shut down. In an embodiment herein, a routine is provided for orderly termination of the synchronization process. If it is determined at the test step 208 that the device is not being shut down, then control transfers from the test step 208 back to the step 204 for another iteration. Otherwise, control transfers from the test step 208 to a step 212 where processing related to shutting down the device is performed. The processing performed at the step 212 is discussed in more detail elsewhere herein. Following the step 212, processing is complete.

Figure 4:
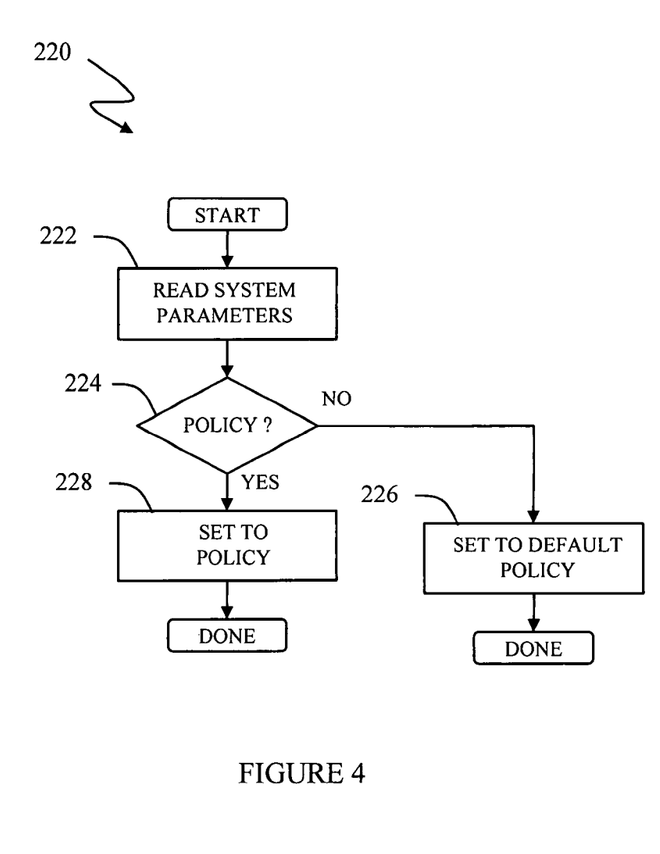
FIG. 4 is a flow chart illustrating initializing a system for synchronizing resources between devices according to an embodiment of the system described herein.

Referring to FIG. 4, a flow chart 220 illustrates in more detail processing performed in connection with initializing the system at the step 202 of the flow chart 200 of FIG. 3. Processing begins at a first step 222 where device system parameters are read. The device system parameters are generic system values that may be used in the initialization and in additional processing, and may include parameters like disk/partition size, data communication speed, etc. Following the step 222 is a test step 224 where it is determined if a policy has been defined for the device. In an embodiment herein, a policy may be defined for each device that determines how the device handles synchronization of resources. In some embodiments, each of the devices 104-106 has its own separate policy while in other embodiments, all of the devices 104-106 have the same policy. Device policies and the uses thereof are discussed in more detail elsewhere herein.

If it is determined at the test step 224 that there is no defined policy for a device, then control transfers from the test step 224 to a step 226 where a default policy is used. In an embodiment herein, a default policy causes the synchronization processing to run once every minute and to reserve ten percent of available disk/partition space for synchronizing files. A disk full warning/indicator may be provided when the reserved space is 95% full. In addition, the reserved space may be subdivided so that one third of the space is reserved for office files (e.g., .doc files, .ppt files, etc.), one third of the space is reserved for picture files (e.g., .jpg files, .tif files, etc), and the remaining third of the space may be reserved for music files. Of course, other default parameters/settings may be used. Following the step 226, processing is complete.

If it is determined at the test step 224 that there is a defined policy for a device, then control transfers from the test step 224 to a step 228 where the defined policy is used. In some embodiments, a user interface may be provided on the device or on another device to allow the user to adjust the policy. In some cases, the policy may be adjusted by only certain users (e.g., admin users). The user interface for adjusting/setting policy may include an interface for browser access. Any appropriate mechanism may be used to allow a user to set and/or adjust the policy. Following the step 228, processing is complete.

Figure 5:
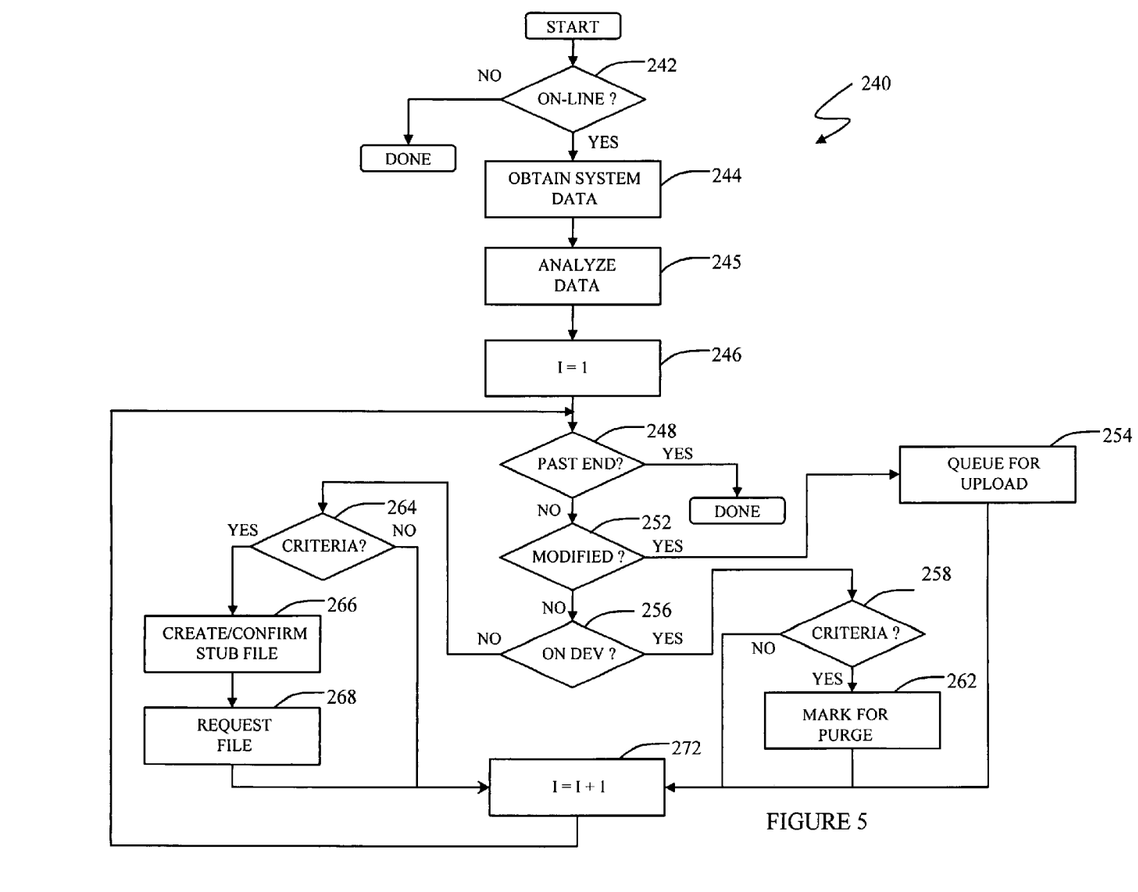
FIG. 5 is a flow chart illustrating in detail synchronizing resources at a device according to an embodiment of the system described herein.

Referring to FIG. 5, a flow chart 240 illustrates in more detail processing performed by a device in connection performing synchronization of resources (files) at the step 204 of the flow chart 200 of FIG. 3. Processing begins at a first test step 242 where it is determined if the device is on-line (i.e., is the device in communication with the centrally accessible storage 102 or at least one other one of the devices 104-106. If not, then processing is complete. In an embodiment herein, a device does not perform synchronization unless the device is on-line. In other embodiments, it may be possible for a device to perform at least some of the synchronization process without being on-line, and then performing the remaining synchronization process after subsequently coming on-line.

If it is determined at the step 242 that the device is on-line, then control transfers from the step 242 to a step 244 where system data is obtained. In an embodiment herein, at least one of the entities of the system, such as the centrally accessible storage 102, keeps track of the resources (files) being synchronized as well as information used in connection with synchronization processing, such as file access statistics. Thus, at the step 244, the device obtains this information to be used for subsequent processing that determines files to be synchronized/purged on the device. In some embodiments, file access statistics include information about when a file is created, modified, and/or renamed, but not when a file is read. In other embodiments, file access statistics include information about when a file is read.

Following the step 244 is a step 245 where the data is analyzed. The analysis performed at the test steps 245 may relate to accesses of the resources (files) where more accesses (and more recent accesses) may make the file more desirable to transfer to the device while less accesses (and less recent accesses) may make the file less desirable to transfer to the device and/or may make the file a candidate for being removed (purged) from the device. In some embodiments, accesses include reading a file as well as creating or modifying the file. In other embodiments, accesses do not include reading the file. The accesses may be weighted depending on the type of access and/or type of device used for the access so that, for example, accessing a file from a laptop may be given a greater weight than accessing a file using a cell phone. The system described herein may use any appropriate mechanism to analyze the data to determine when to remove files and when to transfer files. The analysis at the step 245 may also take into account the size of the file, the bandwidth of the communication channel used to transfer date to and from the device, and possibly a budget for the amount of time a user wishes to spend synchronizing files.

In an embodiment herein, the analysis may be based on a user's desire to have a particular resource provided on a particular device. The user's desire may be estimated according to the product of the amount of activity associated with the particular resource and the probability that the particular resource will be accessed on the particular device. Any appropriate technique may be used to estimate the activity associated with each resource. In an embodiment herein, the following equation may be used to assess activity:

$$A(R) = \sum_{a \in Act(R)} F(a) + W(a) \cdot 2^{-\frac{T(sync)-T(a)}{H(a)}}$$

where Act(R) is the set of actions taken on resource R over all devices in which R is stored, F(a) is a activity weight associated with action a, W(a) is the weight associated with action a, T(a) is the time that action a occurred, T(sync) is the time at which the data synchronization will occur, and H(a) is the half-life associated with action a expressed in the same units as T(sync)–T(a)—ie, H(a) is time since the activity at which the activity loses half its initial weight). F(a), H(a) and W(a) may be set/determined empirically and may be adjusted to favor/disfavor certain activities. The set of actions, Act(R), taken on resource R may include actions taken the user and/or actions related to R taken by some other user(s). Note also that it is possible to take into account the user's desire to maintain backup files, maintaining music files on devices containing provision for playing music (e.g., iTunes software), a users desire to maintain certain types of files on certain devices, and possibly a user's indication that certain files and types of files be replicated immediately. In some embodiments, Act(R) may be the set of actions taken on resource R over only a subset of the devices in which R is stored.

The equation above defines a total "weight" A(R) of resource R as the sum of a weight associated with each action that the user (and/or other users) have taken on R. The values of F(a), W(a) and H(a) allow the weight to vary with the time T(a) that the action has taken in a number of possible ways. For example, the weight can drop off very rapidly with the time since the action occurred, or it can increase slowly, or any other appropriate possibility. The synchronization algorithm may use the specified values to determine which resources should be synchronized before others. Of course the equation is not completely general. For example, there may be no possible values for F(a), W(a), H(a) to capture a desired outcome where an action causes a file to become more important for some period of time and then to gradually become less important. So the equation above should be understood as just an example of how all the actions Act(R) that were taken on resource R can be combined into a single overall number "weight" A(R). Other equations are possible.

To estimate the probability of a particular device being used, it is possible to use information such as amount of prior use (e.g., if 10% of a user's activity over the past year has been on device D, then it can be estimated that the probability of future use is 10%). In addition, the user may provide explicit input about use (e.g., the user is about to take his laptop on a trip). It may also be possible to use geographical constraints. For example, if the user is close to his desktop computer, then the probability of use may approach 100%. Similarly, device status may be used so that, for example, if a device is shut down, the probability of use is zero.

The result of the analysis at the step 245 may be a score (or similar) that may be used for follow on processing to determine when to request/purge resources, as described in more detail elsewhere herein. Following the step 245 is a step 246 when an index variable, I, is set to one. The index variable, I, is used to iterate through processing for all of the resources. Following the step 246 is a test step 248 where it is determined if all of the resources have been processed by determining if I points past the end of the resources. That is, if there are N resources, the test at the step 248 determined is I is greater than N. If so, then processing is complete. Otherwise, control transfers from the test step 248 to a test step 252 where it is determined if the resource (file), indicated by the index variable, I, has been modified locally at the device. For example, if the device is a laptop computer and the resource is a spreadsheet file, the test at the step 252 determines if the spreadsheet file has been modified at the laptop since the previous time that the processing illustrated by FIG. 5 had been performed. Note that, in other embodiments, it may be possible to parallel process more than one resource at a time.

If it is determined at the test at the step 252 that the resource (file) indicated by the index variable, I, has been modified at the device, then control transfers from the step 252 to a step 254 where the resource (file) is queued for upload from the device to the centrally accessible storage 102 (in embodiments where data is transferred therethrough). In embodiments where data may be transferred peer-to-peer, the step 254 may be eliminated altogether and/or the data may be queued to be transferred to one or more of other ones of the devices 104-106. As discussed elsewhere herein, in some embodiments, all resources are transferred through the centrally accessible storage 102 in connection with synchronization while in other embodiments, resources may be transferred between the devices 104-106 in connection with synchronization.

If it is determined at the test step 252 that the resource (file) has not been modified at the device, then control transfers from the test step 252 to a test step 256 where it is determined if the resource (file) is on the device. In an embodiment herein, each of the devices 104-106 maintains a subset of the resources that depends, at least in part, on the storage capacity of the device. Thus, it is possible for the system to be synchronizing a number of resources that are not presently stored on the device. If it is determined at the step 256 that the resource is stored on the device, then control transfers from the test step 256 to a test step 258 where it is determined if the resource meets a criteria for being removed from the device. The criteria used at the step 258 is based on the analysis/score provided at the step 245 and is discussed in more detail elsewhere herein. If it is determined at the test step 258 that the resource (file) meets the criteria for being removed, control passes from the test step 258 to a step 262 where the resource is marked for purging. In an embodiment herein, resources may be marked for purging and then only deleted when and if the additional storage space is needed. In such a case, it may be possible to clear/reset the purge indicator if the resource (file) does not meet the criteria for removal at the step 258. In other embodiments, the resource (file) may be deleted immediately at the step 262.

If it is determined at the step 256 that the resource (file) is not currently stored on the device, then control transfers from the test step 256 to a test step 264 where it is determined if the resource (file) meets a criteria for being transferred to the device. The criteria used at the test step 264 is based on the analysis/score provided at the step 245 and is discussed in more detail elsewhere herein. In an embodiment herein, the criteria at the step 264 may be different than the criteria used at the step 258 (i.e., a different score/threshold). However, in other embodiments, it is possible to use the same criteria at the steps 258, 264. If it is determined at the step 264 that the resource (file) meets the criteria for being transferred to the device, then control transfers from the step 264 to a step 266 where a stub file is created and/or confirmed (i.e., if the stub file already exists). The stub file may include file information such as the file name, the date of creation, etc. without including the contents of the file. In an embodiment herein, all of the devices 104-106 have either a file or a stub file for every resource that is being synchronized for the devices 104-106. In other embodiments, it is possible for each of the devices to include a file or a stub file for only a subset of the files being synchronized. In still other embodiments, it is possible to not use stub files at all.

Following the step 266 is a step 268 where the file to be transferred to the device is requested. The request may be either to the centrally accessible storage 102 or to the other one of the devices 104-106 that contains the file. Following the step 268 is a step 272 where the index variable, I, is incremented. Note that the step 272 is also reached from the step 254, from the step 258 if the criteria is not met, or from the step 264 if the criteria is not met. Following the step 272, control transfers, back to the test step 248 for another iteration.

In some embodiments, the requests provided at the step 268 may be ordered in a queue according to the estimation of the user's desire to have a particular resource (file) provided on the device. Thus, the resource (file) determined to be the most desirable may be placed at the head of the queue, the second most desirable placed second in the queue, etc.

Figure 6:
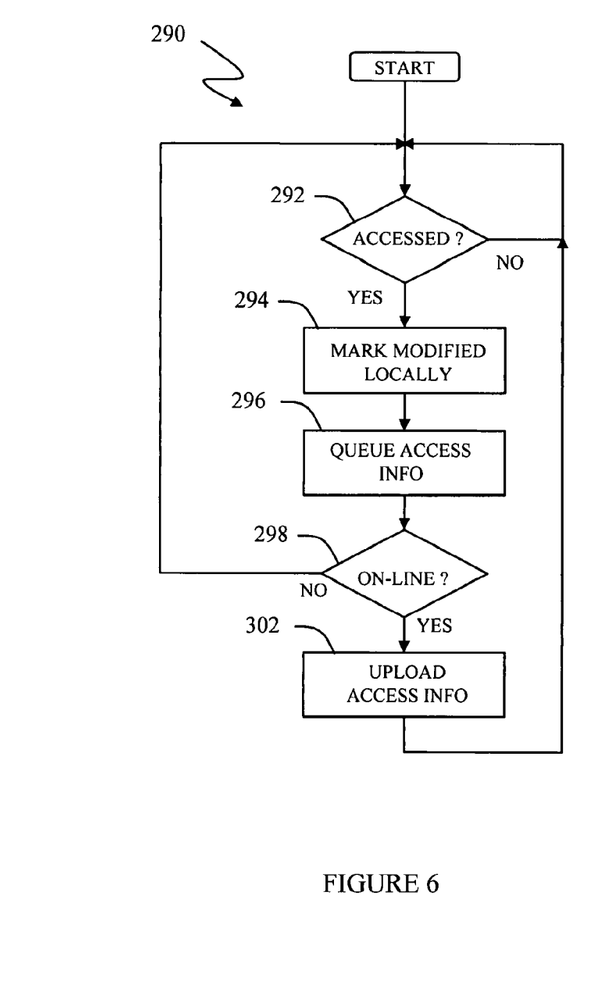
FIG. 6 is a flow chart illustrating providing resource access information according to an embodiment of the system described herein.

Referring to FIG. 6, a flow chart 290 illustrates steps performed by a device in connection with the device providing information about resource (file) accesses locally at the device. As explained elsewhere herein, either the centrally accessible storage 102, one of the device 104-106, and/or some other entity (not shown) accumulates resource access information for use by the system described herein. Processing begins at a first step 292 where it is determined if any resources (files) have been accessed at the device. If not, control transfers back to the step 292 to continue polling. Otherwise, control transfers from the test step 292 to a step 294 where, if the resource has been modified, it is marked as having been modified locally. As discussed elsewhere herein, resources (files) that are modified locally are uploaded for synchronization to other devices.

Following the step 294 is a step 296 where information about the access, such as the type of access, is queued for transmission. Following the step 296 is a test step 298 where it is determined if the device is on-line (communicating with the centrally accessible storage 102 and/or other ones of the devices 104-106). If not, then control transfers from the test step 298 back to the step 292 to continue polling for new accesses. Otherwise, control transfers from the test step 298 to a step 302 where the queued access information is uploaded to the entity that handles accumulating access information from all of the devices 104-106. Following the step 302, control transfers back to the step 292 for another iteration.

Figure 7:
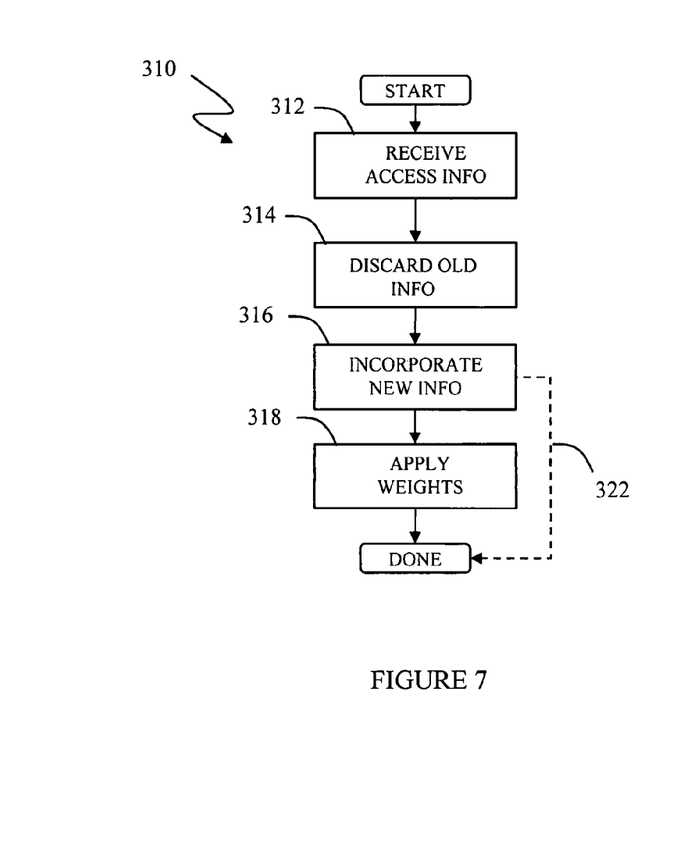
FIG. 7 is a flow chart illustrating processing access information according to an embodiment of the system described herein.

Referring to FIG. 7, a flow chart 310 illustrates steps performed by an entity that accumulates access information for all of the devices. Processing begins at a first step 312 where the entity receives individual access information from each of the devices 104-106. Following the step 312 is a step 314 where the entity discards relatively old information. The specific age at which information is discarded depends upon a variety of functional factors familiar to one of ordinary skill in the art. In some embodiments, data may not be discarded at all. Following the step 314 is a step 316 where new access information is incorporated. The steps 314, 316 represent providing a sliding window on the access information.

Following the step 316 is a step 318 where weights are applied to the data. As discussed elsewhere herein, it is possible to apply different weights to different types of accesses at different devices so that, for example, a file modification has a greater weight than reading a file. Following the step 318, processing is complete. In some embodiments, it is possible to forgo applying weights to the accessing information and/or to have other processes/devices apply the weights. This is represented by an alternative path 32 shown in FIG. 7.

Figure 8:
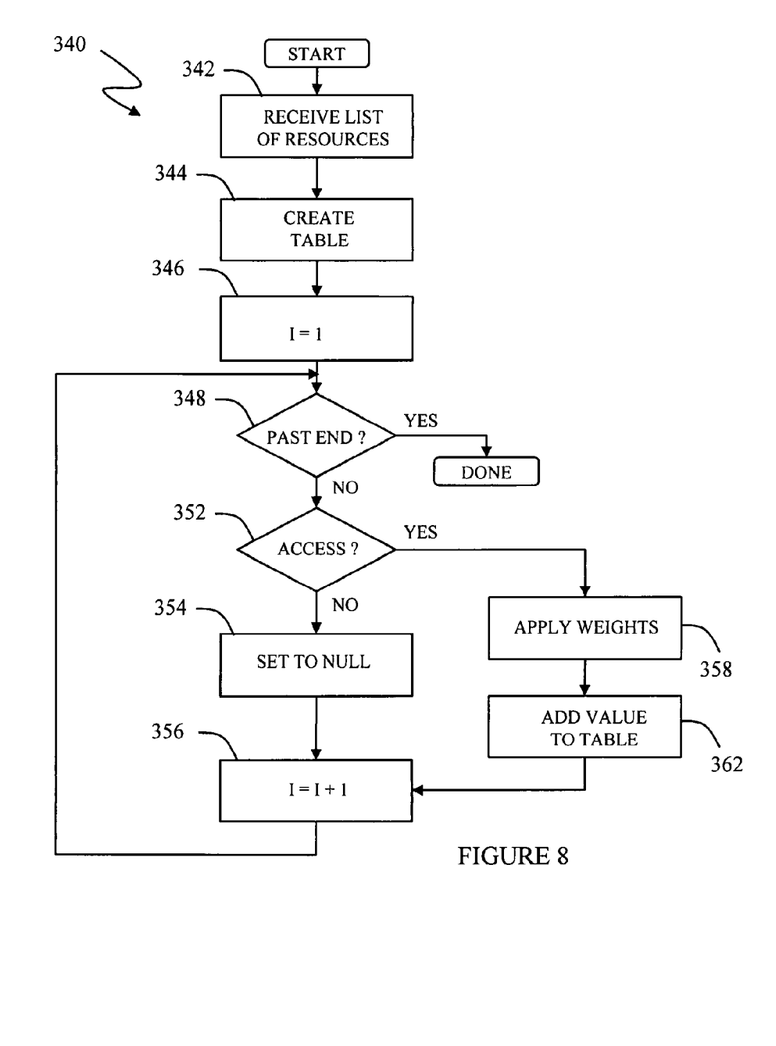
FIG. 8 is a flow chart illustrating aggregating criteria for determining disposition of resources on a device according to an embodiment of the system described herein.

Referring to FIG. 8, a flow chart 340 illustrates steps performed by a device in connection with calculating access values for each of the resources, which may be used in connection with one or both of the test steps 258, 264 of the flow chart 240 of FIG. 5, discussed above. Processing begins at a first step 342 where the device receives a list of resources. Following the step 342 is a step 344 where the device creates a table based on the list of resources received at the step 342. Following the step 344 is a step 346 where an index variable, I, is set to one. The index variable, I, is used to iterate through all of the resources.

Following the step 346 is a test step 348 where it is determined if the index variable, I, indicates that all of the resources have been processed. If so, then processing is complete. Otherwise, control transfers from the test step 348 to a test step 352 where it is determined if there have been any accesses for the resource (based on information provided to the device, discussed elsewhere herein). If it is determined at the test step 352 that there have been no accesses for the device, then control passes from the test step 352 to a step 354 where the value in the table corresponding to the resource is set to null. Following the step 354 is a step 356 where the index variable, I, is incremented. Following the step 356, control transfers back to the step 348 for another iteration.

If it is determined at the test step 352 that the resource has been accessed, then control transfers from the test step 352 to a step 358 where weights may be provided to the access values. As discussed elsewhere herein, weights may be used to emphasize and deemphasize certain types of accesses. In some embodiments, no weights may be used. Following the step 358 is a step 362 where the values are added to the table. Thus, the resulting table will contain an entry for each resource and a corresponding value (or null) indicating the amount of access for the resource. Following the step 362, control transfers to the step 356, discussed above, for another iteration.

Figure 9:
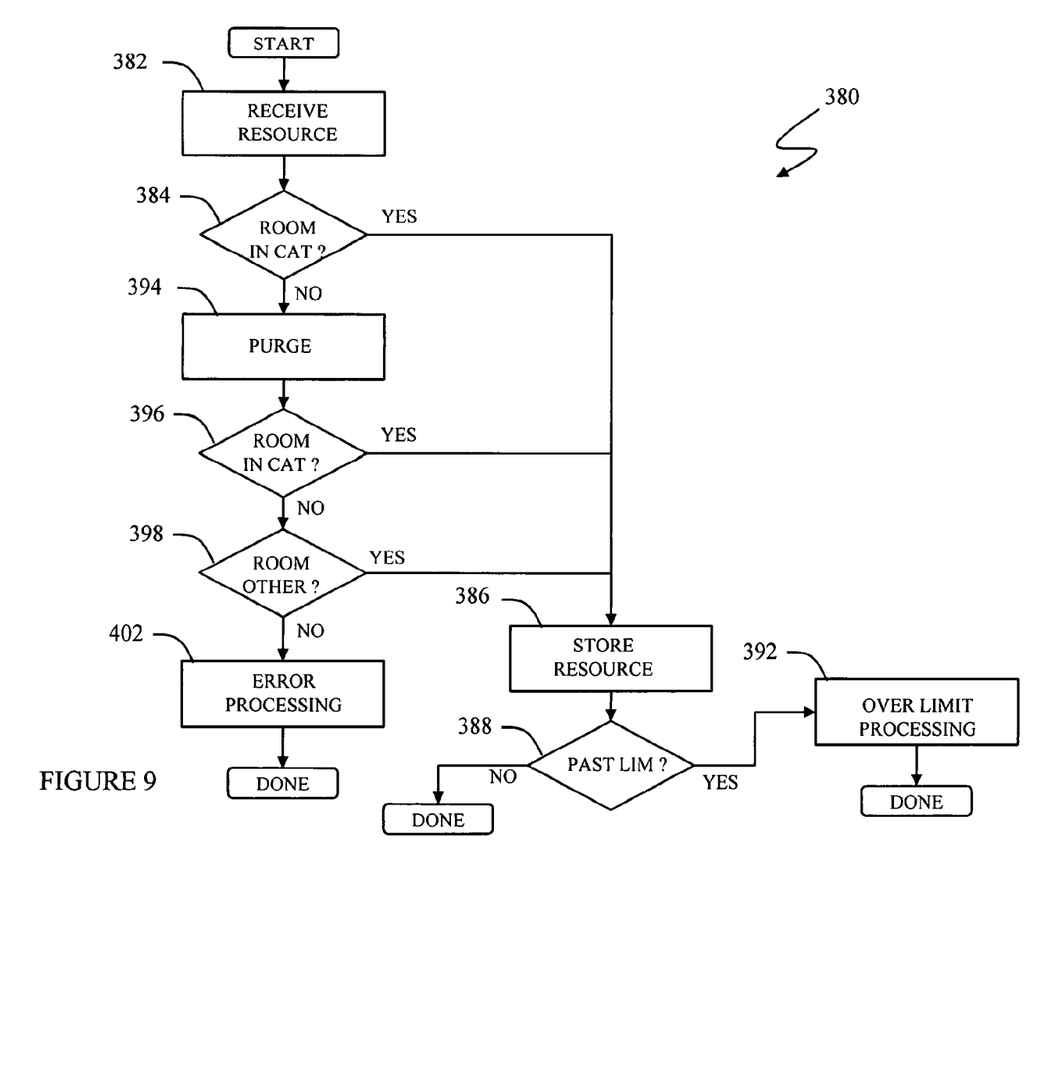
FIG. 9 is a flow chart illustrating storing resources on a device according to an embodiment of the system described herein.

Referring to FIG. 9, a flow chart 380 illustrates steps performed by a device in connection with receiving a resource (file) for storing on the device. As discussed elsewhere herein, it may be possible to subdivide the available storage space into a certain amount for office files, a certain amount for photos, and a certain amount for music files. Processing begins at a first step 382 where the device receives a resource (file) for storing. Following the step 382 is a test step 384 where it is determined if there is sufficient room in the appropriate subdivision for the received file. If so, then control passes from the step 384 to a step 386 where the file is stored on the device. Following the step 386 is a test step 388 where it is determined if the amount of information that is stored exceeds the set limit (e.g., 95% of storage capacity). If not, then processing is complete. Otherwise, control transfers from the test step 388 to a step 392 where appropriate over limit process is performed (e.g., providing a message to the user). Following the step 392, processing is complete.

If it is determined at the step 384 that there is not room to store the received file in the appropriate category (e.g., music, photo, etc.), then control passes from the test step 384 to a step 394 where a purge is performed. In an embodiment herein, purging at the step 394 causes files marked for deletion (discussed elsewhere herein) to be deleted. In some embodiments, it is possible to perform a partial purge (e.g. 50%, only the particular category, etc.). Following the step 394 is a test step 396 where it is determined if, following the purge, there is now enough room in the category. If so, then control transfers from the test step 396 to the step 386, discussed above, where the file is stored.

If it is determined at the step 396 there is still not enough room on the device to store the received file, then control transfers from the test step 396 to a test step 398 where it is determined if there is possibly enough room to store the file in other categories. In an embodiment herein, files may be stored in a subdivision for different types of files when there is not otherwise enough room to store the file. In other embodiments, there may not be any categories and/or it may not be permissible to store resources of one category in a storage area reserved for a different category. If it is determined at the step 398 that there is enough room to store the file, then control transfers from the test step 398 to the step 386, discussed above, where the file is stored. Otherwise, control transfers from the test step 398 to a step 402 where error processing is performed. The error processing performed at the step 402 may include providing an error message to the user. In other embodiments, the processing performed at the step 402 may include deleting additional resources (files), such as one or more files that are the least recently used. Another possibility is to increase the size of the available storage, if possible.

Figure 10:
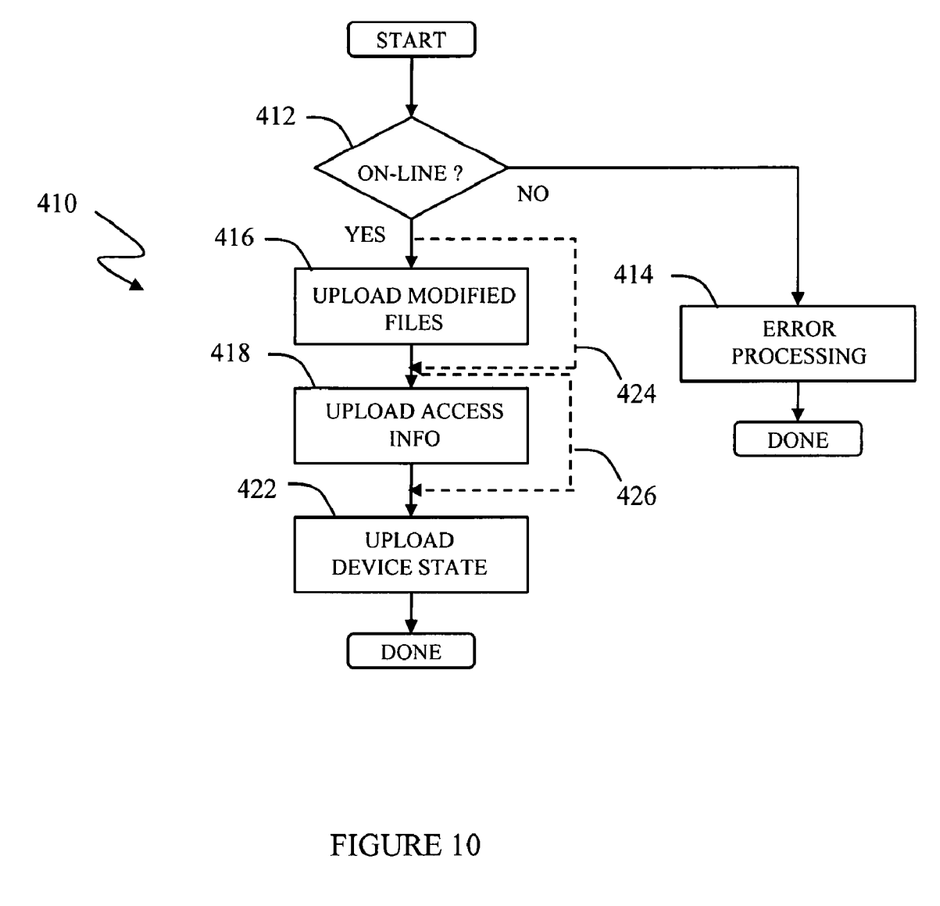
FIG. 10 is a flow chart illustrating orderly shutdown of a device according to an embodiment of the system described herein.

Referring to FIG. 10, a flow chart 410 illustrates in more detail the step 212 of the flow chart 200 of FIG. 3 in connection with a device being shut down. Processing begins at a first test step 412 where it is determined if the device is on-line (in communication with the centrally accessible storage 102 and/or at least one other ones of the devices 104-106). If not, then control transfers from the step 412 to a step 414 where error processing is performed. The error processing performed at the step 414 may include providing a message to a user. Following the step 414, processing is complete.

If it is determined at the step 412 that the device is on-line, then control transfers from the step 412 to a step 416 where resources (files) that have been locally modified are uploaded, as discussed elsewhere herein. Following the step 416 is a step 418 where any remaining queued access information is uploaded. Following the step 418 is a step 422 where the device state (i.e., about to shut down) is uploaded. As discussed elsewhere herein, in some cases it is possible to use the device state to estimate future use of the device. Following the step 422, processing is complete. Note that the step 416 and/or the step 418 are optional (may not be performed), as illustrated by alternative paths 424, 426 provided in the flow chart 410.

In some instances, the order of steps in the flow charts may be modified, where appropriate. The system described herein may be implemented using a computer program product/software provided in a fixed computer-readable storage medium.

While the invention has been disclosed in connection with various embodiments, modifications thereon will be readily apparent to those skilled in the art. Accordingly, the spirit and scope of the invention is set forth in the following claims.

What is claimed is:

1. A method of synchronizing resources shared among a plurality of devices, comprising:
   determining access information about each of the resources, wherein the access information includes information about a set of actions taken on each of the resources;
   determining activity for each of the resources on at least a subset of the devices based on the access information, wherein activity for a particular one of the resources is based on a sum of weights associated with the set of actions corresponding to the particular one of the resources and wherein each of the weights is adjusted according to a time that a corresponding action occurred, wherein the activity A(R) for the particular one of the resources is estimated according to the following formula:

$$A(R) = \sum_{a \in Act(R)} F(a) + W(a) \cdot 2^{-\frac{T(sync)-T(a)}{H(a)}}$$

where Act(R) is the set of actions taken on resource R over devices in which R is stored, F(a) is an activity weight associated with action a, W(a) is a weight associated with action a, T(a) is a time that action a occurred, T(sync) is a time at which the data synchronization will occur, and H(a) is a half-life associated with action a;
   estimating future use of the devices;
   providing an estimate of a desire to have particular resources on particular devices according to the activity and future use; and
   synchronizing resources according to the estimate of a desire to have particular resources on particular devices.

2. A method, according to claim 1, wherein the resources are data files.

3. A method, according to claim 1, wherein access information includes information about when the resources were read.

4. A method, according to claim 1, wherein access information includes information about when the resources were renamed, created, and modified.

5. A method, according to claim 1, wherein estimating a desire to have particular resources on particular devices takes into account a user's desire to maintain backup files, a user's desire to maintain certain types of files on certain devices, and a user's indication that certain files and types of files be replicated immediately.

6. A method, according to claim 1, wherein F(a), H(a) and W(a) are set/determined empirically and adjusted to favor/disfavor certain activities.

7. A method, according to claim 1, wherein the resources are subdivided into categories wherein each of the resources is stored on a device according to the category of the resource.

8. Computer software, provided in a non-transitory computer-readable storage medium, that synchronizes resources shared among a plurality of devices, the software comprising:
   executable code that determines access information about each of the resources, wherein the access information includes information about a set of actions taken on each of the resources;
   executable code that determines activity for each of the resources on at least a subset of the devices based on the access information, wherein activity for a particular one of the resources is based on a sum of weights associated with the set of actions corresponding to the particular one of the resources and wherein each of the weights is adjusted according to a time that a corresponding action occurred, wherein the activity A(R) for the particular one of the resources is estimated according to the following formula:

$$A(R) = \sum_{a \in Act(R)} F(a) + W(a) \cdot 2^{-\frac{T(sync)-T(a)}{H(a)}}$$

where Act(R) is the set of actions taken on resource R over devices in which R is stored, F(a) is an activity weight associated with action a, W(a) is a weight associated with action a, T(a) is a time that action a occurred, T(sync) is a time at which the data synchronization will occur, and H(a) is a half-life associated with action a;

executable code that estimates future use of the devices;

executable code that provides an estimate of a desire to have particular resources on particular devices according to the activity and future use; and executable code that synchronizes resources according to the estimate of a desire to have particular resources on particular devices.

9. Computer software, according to claim 8, wherein the resources are data files.

10. Computer software, according to claim 8, wherein access information includes information about when the resources were read.

11. Computer software, according to claim 8, wherein access information includes information about when the resources were renamed, created, and modified.

12. Computer software, according to claim 8, wherein executable code that estimates a desire to have particular resources on particular devices takes into account a user's desire to maintain backup files, a user's desire to maintain certain types of files on certain devices, and a user's indication that certain files and types of files be replicated immediately.

13. Computer software, according to claim 1, wherein F(a), H(a) and W(a) are set/determined empirically and adjusted to favor/disfavor certain activities.

14. A device, comprising:

a plurality of resources; and software, provided in a non-transitory computer-readable storage medium, that synchronizes resources shared by the device with other devices, the software including executable code that receives access information about resources, wherein the access information includes information about a set of actions taken on each of the resources, the software also including executable code that determines activity for each of the resources based on the access information, wherein activity for a particular one of the resources is based on a sum of weights associated with the set of actions corresponding to the particular one of the resources and wherein each of the weights is adjusted according to a time that a corresponding action occurred, wherein the activity A(R) for the particular one of the resources is estimated according to the following formula:

$$A(R) = \sum_{a \in Act(R)} F(a) + W(a) \cdot 2^{-\frac{T(sync)-T(a)}{H(a)}}$$

where Act(R) is the set of actions taken on resource R over devices in which R is stored, F(a) is an activity weight associated with action a, W(a) is a weight associated with action a, T(a) is a time that action a occurred, T(sync) is a time at which the data synchronization will occur, and H(a) is a half-life associated with action a, and wherein the software also including executable code that provides an estimate of a desire to have particular resources on the device according to the activity and an estimate of future use of the device, and executable code that requests resources from the other devices according to the estimate.

15. A device, according to claim 14, wherein the resources are data files.

16. A device, according to claim 14, wherein access information includes information about when the resources were read.

17. A device, according to claim 14, wherein access information includes information about when the resources were renamed, created, and modified.

18. A device, according to claim 14, wherein executable code that estimates a desire to have particular resources on the device takes into account a user's desire to maintain backup files, a user's desire to maintain certain types of files on certain devices, and a user's indication that certain files and types of files be replicated immediately.

* * * * *